(12) United States Patent
Wright et al.

(10) Patent No.: US 9,976,907 B1
(45) Date of Patent: May 22, 2018

(54) AIRPLANE-MOUNTED EXTERNAL FIRE DETECTION SYSTEM

(71) Applicant: The Boeing Company, Chicago, IL (US)

(72) Inventors: Robert Steven Wright, Seattle, WA (US); Van Jerold Winters, Bellevue, WA (US)

(73) Assignee: THE BOEING COMPANY, Chicago, IL (US)

( * ) Notice: Subject to any disclaimer, the term of this patent is extended or adjusted under 35 U.S.C. 154(b) by 0 days. days.

(21) Appl. No.: 15/641,975

(22) Filed: Jul. 5, 2017

(51) Int. Cl.
*G08B 17/00* (2006.01)
*G01J 5/00* (2006.01)
*G08B 17/12* (2006.01)

(52) U.S. Cl.
CPC .......... *G01J 5/0088* (2013.01); *G08B 17/125* (2013.01)

(58) Field of Classification Search
CPC .......... G01J 5/00; G01J 5/0014; G01J 5/0018; G01J 5/0081; G01J 5/0088; G01J 5/48; G01J 11/00; G01J 11/005; G08B 17/00; G08B 17/005; G08B 17/08; G08B 17/12; F01C 9/28; G01C 23/00
See application file for complete search history.

(56) References Cited

U.S. PATENT DOCUMENTS

| 6,408,259 | B1* | 6/2002 | Goebel | B64D 43/00 |
| | | | | 701/100 |
| 7,487,029 | B2* | 2/2009 | Feeney | F01D 19/00 |
| | | | | 415/17 |
| 7,505,604 | B2* | 3/2009 | Zakrzewski | B64D 45/0015 |
| | | | | 382/100 |
| 7,729,510 | B2* | 6/2010 | Zakrzewski | B64D 45/0015 |
| | | | | 340/630 |
| 8,400,502 | B2* | 3/2013 | Zakrzewski | B64D 45/0015 |
| | | | | 348/122 |
| 9,127,597 | B2* | 9/2015 | Masiello | F02C 9/28 |

* cited by examiner

*Primary Examiner* — Van Trieu
(74) *Attorney, Agent, or Firm* — Coats & Bennett, PLLC

(57) ABSTRACT

An aircraft-mounted external fire detection system includes optical circuitry and processing circuitry. The optical circuitry is mounted on an aircraft aft of an engine nacelle of the aircraft, and is configured to optically monitor an exterior of the engine nacelle for a hydrocarbon fire by detecting radiation outside of the visible light spectrum. The processing circuitry is communicatively coupled to the optical circuitry and is configured to use the optical circuitry to determine that the fire has been continuously present for more than a threshold duration, and in response, transmit a warning to an operator terminal of the aircraft.

20 Claims, 11 Drawing Sheets

400

```
┌─────────────────────────────────────────────────┐
│ OPTICALLY MONITORING AN EXTERIOR OF AN ENGINE   │
│ NACELLE OF AN AIRCRAFT FOR A HYDROCARBON FIRE BY│
│  DETECTING RADIATION OUTSIDE OF THE VISIBLE LIGHT│
│  SPECTRUM USING OPTICAL CIRCUITRY MOUNTED ON THE │
│       AIRCRAFT AFT OF THE ENGINE NACELLE        │
│                      410                        │
└─────────────────────────────────────────────────┘
                         │
                         ▼
┌─────────────────────────────────────────────────┐
│  USING THE OPTICAL CIRCUITRY TO DETERMINE THAT THE│
│  FIRE HAS BEEN CONTINUOUSLY PRESENT FOR MORE THAN A│
│  THRESHOLD DURATION, AND IN RESPONSE, TRANSMITTING A│
│   WARNING TO AN OPERATOR TERMINAL OF THE AIRCRAFT │
│                      420                        │
└─────────────────────────────────────────────────┘
```

FIG. 4

AIRPLANE-MOUNTED EXTERNAL FIRE DETECTION SYSTEM

TECHNICAL FIELD

The present disclosure generally relates to the field of fire detection systems, and more particularly to the field of aircraft-mounted external fire detection systems.

BACKGROUND

Jet aircraft commonly house one or more engines in respective nacelles. These nacelles are commonly mounted under a wing of the aircraft. Engine fire detectors are often located within specific fire zones inside of the engine/nacelle arrangement. Such fire zones typically include the area between the engine case and the inner wall of the nacelle, around the engine fan case and/or the engine core. These detectors allow the flight crew to be alerted in the event that fire exists within that volume, i.e., external to the engine but within the nacelle compartment.

SUMMARY

The present disclosure relates to methods, apparatuses, systems, computer program products, software, and/or mediums for aircraft-mounted external fire detection. According to the present disclosure, an aircraft-mounted external fire detection system comprises optical circuitry mounted on an aircraft. The optical circuitry is configured to optically monitor an exterior of the engine nacelle for a hydrocarbon fire by detecting radiation outside of the visible light spectrum. The aircraft-mounted external fire detection system also comprises processing circuitry, which is communicatively coupled to the optical circuitry. The processing circuitry is configured to use the optical circuitry to determine that the fire has been continuously present for more than a threshold duration, and trigger an appropriate response (e.g., transmit a warning to an operator terminal of the aircraft). According to some aspects herein, the aircraft is capable of being manned (e.g., via the operator terminal). According to some aspects herein, the aircraft is capable of operating unmanned. According to particular aspects herein, the aircraft may be capable of spaceflight, may be a rotorcraft, may comprise a rocket and/or may be any other form of airborne vehicle comprising an engine-nacelle arrangement.

According to an aspect of the disclosure, a method implemented in an aircraft-mounted external fire detection system is disclosed. The method comprises optically monitoring an exterior of an engine nacelle of an aircraft for a hydrocarbon fire by detecting radiation outside of the visible light spectrum using optical circuitry mounted on the aircraft aft of the engine nacelle. The method further comprises using the optical circuitry to determine that the fire has been continuously present for more than a threshold duration, and in response, transmitting a warning to an operator terminal of the aircraft.

According to a further aspect, the optical circuitry has a field of view comprising a perimeter substantially defined by a maximum expected deflection of the engine nacelle relative to the optical circuitry under maneuvering load of the aircraft such that the exterior of the engine nacelle remains within the field of view during the maneuvering load.

In a further aspect, transmitting the warning to the operator terminal comprises controlling the operator terminal to display video of the engine nacelle. In a further such aspect, controlling the operator terminal to display video of the engine nacelle comprises triggering the operator terminal to display video captured from a ground maneuvering camera system mounted on the aircraft and to which the operator terminal is communicatively connected. In an additional or alternative such aspect, controlling the operator terminal to display video of the engine nacelle is responsive to determining that at least a threshold number of displays are operative at the operator terminal.

In a further aspect, transmitting the warning to the operator terminal comprises controlling the operator terminal to display a notification that is distinct from a further notification produced by a different fire detection system that monitors for fire inside of the engine nacelle.

In a further aspect, the method further comprises receiving a warning suppression signal from the operator terminal, and in response, refraining from sending a further warning to the operator terminal until determining that the fire is no longer present and subsequently determining that another fire has been continuously present for more than the threshold duration.

In a further aspect, the method further comprises optically monitoring the exterior of the engine nacelle for the fire by detecting radiation outside of the visible light spectrum using additional optical circuitry mounted on the aircraft aft of the engine nacelle, and refraining from transmitting the warning to the operator terminal until it is also determined that the fire has been continuously present for more than the threshold duration using the additional optical circuitry.

In a further aspect, the optical circuitry is mounted on a vertical or horizontal stabilizer of the aircraft.

In another aspect of the disclosure, an aircraft-mounted external fire detection system comprises optical circuitry mounted on an aircraft aft of an engine nacelle of the aircraft. The aircraft-mounted external fire detection system further comprises processing circuitry communicatively coupled to the optical circuitry. The optical circuitry is configured to optically monitor an exterior of the engine nacelle for a hydrocarbon fire by detecting radiation outside of the visible light spectrum. The processing circuitry is configured to use the optical circuitry to determine that the fire has been continuously present for more than a threshold duration, and in response, transmit a warning to an operator terminal of the aircraft.

According to a further aspect, to optically monitor the exterior of the engine nacelle, the optical circuitry has a field of view comprising a perimeter substantially defined by a maximum expected deflection of the engine nacelle relative to the optical circuitry under maneuvering load of the aircraft such that the exterior of the engine nacelle remains within the field of view during the maneuvering load.

In a further aspect, to transmit the warning to the operator terminal, the processing circuitry is configured to control the operator terminal to display video of the engine nacelle. In a further such aspect, to control the operator terminal to display video of the engine nacelle, the processing circuitry is configured to trigger the operator terminal to display video captured by a ground maneuvering camera system mounted on the aircraft to which the operator terminal is communicatively connected. In an additional or alternative such aspect, the processing circuitry is configured to control the operator terminal to display video of the engine nacelle responsive to determining that at least a threshold number of displays are operative at the operator terminal.

In a further aspect, to transmit the warning to the operator terminal, the processing circuitry is configured to control the operator terminal to display a notification that is distinct from a further notification produced by a different fire detection system that monitors for fire inside of the engine nacelle.

In a further aspect, the processing circuitry is further configured to receive a warning suppression signal from the operator terminal, and in response, refrain from sending a further warning to the operator terminal until the processing circuitry determines that the fire is no longer present and subsequently determines that another fire has been continuously present for more than the threshold duration.

In a further aspect, the aircraft-mounted external fire detection system further comprises additional optical circuitry mounted on the aircraft aft of the engine nacelle. The additional optical circuitry is configured to optically monitor the exterior of the engine nacelle for the fire by detecting radiation outside of the visible light spectrum. The processing circuitry is further configured to refrain from transmitting the warning to the operator terminal until the processing circuitry also determines that the fire has been continuously present for more than the threshold duration using the additional optical circuitry.

In a further aspect, the optical circuitry is mounted on a vertical or horizontal stabilizer of the aircraft.

In a further aspect, the aircraft-mounted external fire detection system is configured to perform any of the methods described herein, e.g., via appropriate configuration of the processing circuitry.

Further aspects are directed to include systems, computer program products, and/or software that correspond to one or more of the methods described herein.

BRIEF DESCRIPTION OF THE DRAWINGS

Aspects of the present disclosure are illustrated by way of example and are not limited by the accompanying figures with like references indicating like elements. In general, the use of a reference numeral should be regarded as referring to the depicted subject matter generally, whereas discussion of a specific instance of an illustrated element will append a letter designation thereto (e.g., discussion of an optical circuitry 120, generally, as opposed to discussion of particular instances of optical circuitry 120a, 120b).

FIG. 4 is a flow diagram illustrating an example method, according to an aspect of the present disclosure.

DETAILED DESCRIPTION

Aspects of the present disclosure are directed to methods, apparatuses, systems, computer program products, and/or software for aircraft-mounted external fire detection. Traditional aircraft engine fire detection systems do not provide any information regarding whether or not a fire is outside the nacelle wall of an engine/nacelle arrangement. Traditional aircraft engine fire detection systems also do not provide any indication of a fire originating within the engine gas path, such as a tailpipe fire. According to the present disclosure, an aircraft-mounted external fire detection system addresses one or more shortcomings of traditional aircraft engine fire detection systems by, among other things, optically monitoring an exterior of an engine nacelle.

Figure 1:
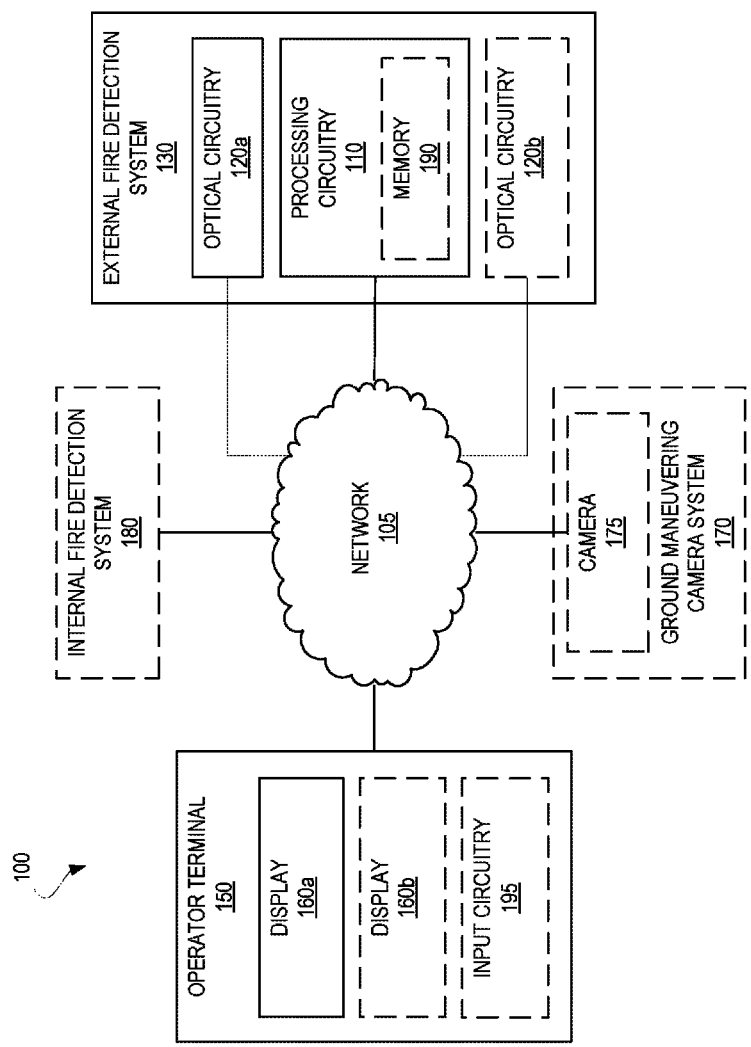
FIG. 1 is a block diagram illustrating an example network environment, according to an aspect of the present disclosure.

FIG. 1 illustrates an example network environment 100 according to an aspect of the disclosure. The example network environment 100 comprises an external fire detection system 130 and an operator terminal 150 communicatively connected to each other via a network 105. The network 105 includes one or more physical devices and/or signaling mediums capable of exchanging communication signals between the external fire detection system 130 and the operator terminal 150. Examples of such a network 105 include (but are not limited to) one or more signaling mediums; one or more local area networks; one or more wireless networks; one or more Internet Protocol-based networks; one or more Ethernet networks; one or more optical networks; one or more ad hoc networks; and/or one or more electrical buses. Such a network 105 may comprise any number of networking devices such as routers, gateways, switches, hubs, firewalls, multiplexers, controllers, and the like (not shown) supporting the exchange of such communication signals.

The external fire detection system 130 comprises optical circuitry 120a and processing circuitry 110. The optical circuitry 120a is configured to optically monitor for a hydrocarbon fire by detecting radiation outside of the visible light spectrum (i.e., ultraviolet and/or infrared radiation). For example, the optical circuitry 120a may be configured to detect a particular wavelength of infrared radiation that is produced in abundance during the burning of a hydrocarbon, such as jet fuel and/or oil. Such optical circuitry 120a may rely on the particular radiation wavelength emitted by a given byproduct of hydrocarbon combustion. For example, hot carbon dioxide produced from the burning of a given hydrocarbon may produce significant amounts of infrared radiation at approximately 4.3 micrometers relative to the surrounding ambient air. Accordingly, the optical circuitry 120a may be configured to trigger a signal in response to a spike in radiation at 4.3 micrometers in wavelength occurring within a particular field of view of the optical circuitry 120a. According to other aspects, the optical circuitry 120a detects and responds to radiation at one or more other wavelengths. In a particular aspect, the optical circuitry 120a is a solar-blind optical flame detector.

The processing circuitry 110 is communicatively coupled to the optical circuitry 120a. According to particular aspects of the disclosure, the processing circuitry 110 comprises one or more microprocessors, microcontrollers, hardware circuits, discrete logic circuits, hardware registers, digital signal processors (DSPs), field-programmable gate arrays (FPGAs), application-specific integrated circuits (ASICs), memory, or a combination thereof. In one such aspect, the processing circuitry 110 includes programmable hardware capable of executing software instructions stored, e.g., in memory 190 as a machine-readable computer program. Aspects of such memory 190 include any non-transitory machine-readable media known in the art or that may be developed, whether volatile or non-volatile, including (but not limited to) solid state media (e.g., SRAM, DRAM, DDRAM, ROM, PROM, EPROM, flash memory, solid state drive, etc.), removable storage devices (e.g., Secure Digital (SD) card, miniSD card, microSD card, memory stick, thumb-drive, USB flash drive, ROM cartridge, Universal Media Disc), fixed drive (e.g., magnetic hard disk drive), or the like, individually or in any combination.

The processing circuitry 110 is configured to use the optical circuitry 120a to determine whether to transmit a warning to the operator terminal 150 via the network 105. In particular, the processing circuitry 110 transmits a warning to the operator terminal 150 in response to determining that the fire has been continuously present for more than a threshold duration (e.g., three seconds; five seconds). The threshold duration may be such that minor flare-ups of exhaust gas and/or ingested objects (e.g., birds) from the engine nacelle and/or fires on the ground moving quickly past the field of view of the optical circuitry 120a are inadequate to cause the processing circuitry 110 to transmit the warning.

In a particular aspect, the threshold duration is one of a plurality of predefined durations with which the processing circuitry 110 is configured. For example, the threshold duration may be of a smaller or larger duration (e.g., three or five seconds) based on whether the processing circuitry 110 is configured to a more or less sensitive fire detection mode, respectively. In a particular aspect, the processing circuitry 110 is configurable through an appropriate control signal sent from the operator terminal 150.

According to particular aspects, the determination that the fire has been continuously present is based on a steady or periodic signal received from the optical circuitry 120a. Other aspects determine that the fire has been continuously present based on a different use of the optical circuitry 120a.

In a further aspect, the external fire detection system 130 comprises additional optical circuitry 120b. In an aspect, the additional optical circuitry 120b is also configured to optically monitor the exterior of an engine nacelle for a hydrocarbon fire by detecting radiation outside of the visible light spectrum. As will be further explained below, in some aspects the engine nacelle monitored by optical circuitry 120b is same as that which is monitored by optical circuitry 120a, and in other aspects, the engine nacelle monitored by optical circuitry 120b is different. For example, according to an aspect in which optical circuitry 120a and optical circuitry 120b monitor the same engine nacelle, the processing circuitry is further configured to refrain from transmitting the warning to the operator terminal 150 until the processing circuitry 110 not only determines that the fire has been continuously present for more than the threshold duration using the optical circuitry 120a, but also determines that the fire has been continuously present for more than the threshold duration using the additional optical circuitry 120b. According to such an aspect, the use of optical circuitry 120a and optical circuitry 120b to monitor the same engine nacelle may improve the detection of the hydrocarbon fire and/or reduce false positive fire detection results, e.g., by optically monitoring the same engine nacelle from different positions. In particular aspect, at least one of these positions is an aft-mounted position. Accordingly, various aspects of the present disclosure include external fire detection systems 130 that optically monitor each of one, some, or all of the engine nacelles on the aircraft from any number of viewpoints, each being mounted with corresponding optical circuitry 120.

In an aspect, the warning transmitted by the processing circuitry 110 controls the operator terminal 150 to display a notification of the fire, e.g., in a manner conspicuous to an operator of the aircraft, such as a pilot or other aircrew member, on a display 160a of the operator terminal 150. Examples of a display 160a according to various aspects herein include a telltale, an annunciator panel, a multi-function display (MFD), a touchscreen display, a Liquid Crystal Display (LCD), and/or a Light Emitting Diode (LED) display. In a particular aspect, the processing circuitry 110 controls the operator terminal 150 to display an engine-indicating and crew-alerting system (EICAS) warning and/or a Master Warning indication on such a display 160a. In some aspects of the present disclosure, the operator terminal 150 further includes input circuitry 195 for accepting input from an operator (e.g., a pilot). According to particular aspects, the input circuitry 195 includes one or more of: a pointing device (e.g., a mouse, stylus, touchpad, trackball, pointing stick, joystick), a microphone (e.g., for speech input), an optical sensor (e.g., for optical recognition of gestures), and/or pushkeys (e.g., a keyboard, number-pad, and/or function keys). According to particular aspects of the present disclosure, the interface circuitry 195 is implemented as a unitary physical component, or as a plurality of physical components that are contiguously or separately arranged, any of which may be communicatively coupled to any other, or may communicate with any other via an appropriate signaling medium (e.g., network 105).

In a particular aspect, the network environment 100 further comprises an internal fire detection system 180 that is communicatively connected to the network 105 and is distinct from the external fire detection system 130. The internal fire detection system 180 monitors for fire inside of the engine nacelle. According to such an aspect, the notification displayed by the operator terminal 150 responsive to the warning from the external fire detection system 130 may be distinct from a further notification produced for the internal fire detection system 180. In a particular aspect, the notification displayed by the operator terminal 150 responsive to the warning is distinct from a flight deck fire switch and fuel cutoff lever corresponding to the engine nacelle experiencing the external fire. Such an aspect may, e.g., enable an operator to distinguish between external and internal nacelle fires (e.g., between a fire in the exhaust gas path and a fire in the engine core), such that the operator may make a correspondingly appropriate response. For example, an internal engine fire may be addressed by cutting fuel to the engine and activating a fire suppression system (not shown), whereas an external fire may be addressed by merely reducing engine throttle and/or changing the fuel mixture to reduce the amount of flammable exhaust being produced from the engine nacelle.

According to particular aspects of the present disclosure, the network environment 100 includes a camera 175, and the warning transmitted by the processing circuitry 110 controls the operator terminal 150 to display video of the engine nacelle captured by the camera 175. The camera 175 is an optical device that treats radiation emitted by the hydrocarbon fire in a manner that is consistent with radiation not emitted by the hydrocarbon fire (i.e., in contrast to the optical circuitry 120). Accordingly, an operator may be afforded with a view of the engine nacelle in response to the external fire detection system 130 detecting the hydrocarbon fire. The ability to view video of the engine nacelle may enable an operator of the aircraft to determine the severity of the fire and determine whether the warning produced by the external fire detection system 130 is a false positive fire detection result, and/or determine whether to land, turnback, and/or evacuate the aircraft.

In an aspect of the present disclosure, a ground maneuvering camera system 170 is comprised in the network environment 100, and the camera 175 is comprised in the ground maneuvering camera system 170. A ground maneuvering camera system 170 is a camera system that includes at least one camera 175 and is commonly used to give an operator of the aircraft a real-time view of areas in proximity to the aircraft (e.g., the landing gear, engine nacelles, and the ground underneath) for use in taxing. According to an aspect, to control the operator terminal 150 to display video of the engine nacelle, the processing circuitry 110 is configured to trigger the operator terminal 150 to display video captured by the ground maneuvering camera system 170 mounted on the aircraft and to which the operator terminal 150 is communicatively connected, i.e., via network 105.

In a particular aspect of the present disclosure, the operator terminal 150 comprises a plurality of displays, e.g., display 160a and display 160b. In a further aspect, the processing circuitry 110 is configured to control the operator terminal 150 to display video of the engine nacelle responsive to determining that at least a threshold number of displays 160a, 160b are operative at the operator terminal 150. For example, in response to the processing circuitry 110 determining that only display 160a is operative (e.g., due to display 160b being inoperative), the processing circuitry 110 may refrain from controlling the operator terminal 150 to display video captured by camera 175. Such an aspect may prevent one of the few (or the only) display 160 in operation at operator terminal 150 from being commandeered by the external fire detection system 130 (which may be in use for displaying other critical information to the pilot, for example).

In a further aspect, the processing circuitry 110 is further configured to receive a warning suppression signal from the operator terminal 150, and in response, refrain from sending a further warning to the operator terminal 150 until the processing circuitry 110 determines that the fire is no longer present and subsequently determines that another fire has been continuously present for more than the threshold duration. For example, the warning suppression signal may be triggered via the operator terminal 150 by an operator of the aircraft who has determined that the fire warning is the result of a false positive and wishes to prevent being further distracted by a corresponding notification on the display 160a.

Figure 2:
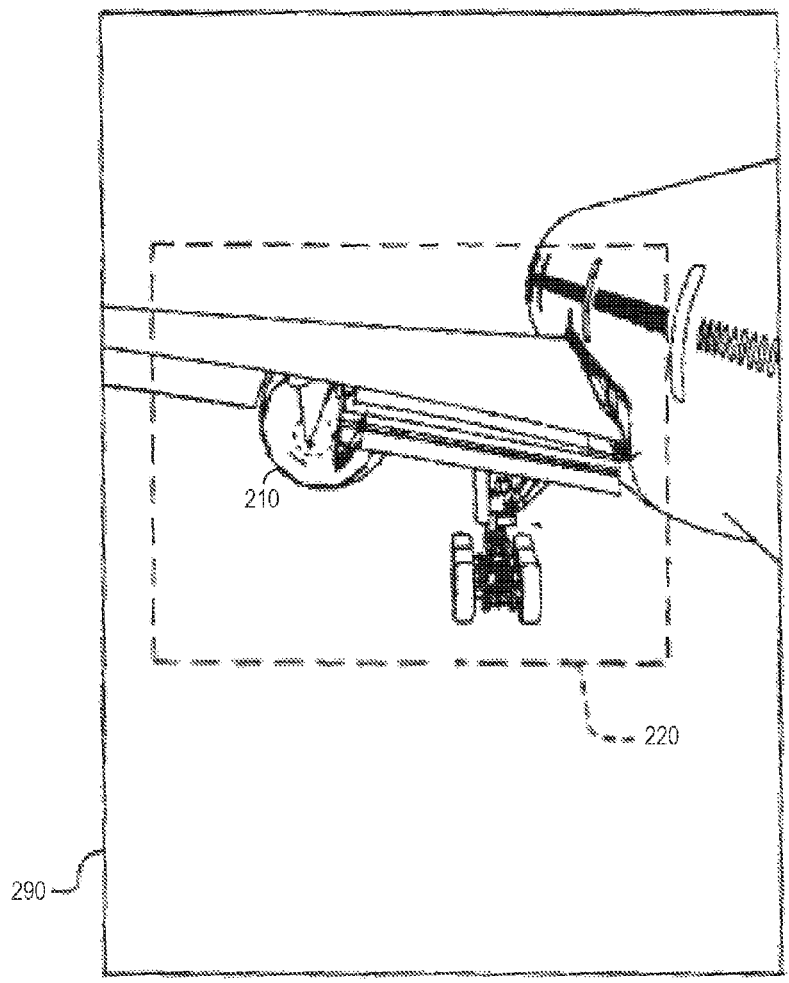
FIG. 2 is an illustration of an example frame of video captured by a aircraft-mounted camera, according to an aspect of the present disclosure.

FIG. 2 illustrates an example frame of video captured from the perspective of a camera 175 of a ground maneuvering camera system 170 mounted aft of an engine nacelle 210, according to an aspect of the present disclosure. The camera 175 captures video within a field of view 290 that includes that engine nacelle 210. The optical circuitry 120a is configured with a field of view 220 with which to optically monitor the engine nacelle 210. As shown in FIG. 2, the field of view 220 of the optical circuitry 120a is narrower than the field of view 290 of the camera 175, yet large enough to include outboard and inboard sides of the engine nacelle 210 (i.e., no portion of the engine nacelle 210 is outside of the perimeter of the field of view 220. In one aspect, the optical circuitry 120a is mounted to the aircraft at a location that is substantially coaxial to the camera 175, such that the perspective of the optical circuitry 120a is substantially as shown in FIG. 2. As will be discussed further below, other aspects include the optical circuitry 120a being mounted at different locations, e.g., such that the field of view 220 similarly extends to a relatively narrow area surrounding the engine nacelle in a manner similar to that illustrated in FIG. 2, albeit from a different perspective.

According to a particular aspect, the relatively narrow field of view 220 around the exterior of the engine nacelle 210 helps to reduce false positive fire detection results by excluding areas where the engine nacelle 210 is unlikely to produce a hydrocarbon fire (e.g., areas outside of the exhaust gas path of the engine nacelle 210). As described above, in an aspect, processing circuitry 110 of the external fire detection system 130 transmits a warning that controls an operator terminal 150 to display video (such as that illustrated in FIG. 2) responsive to detecting a hydrocarbon fire exterior to the engine nacelle 210.

Figure 3A:
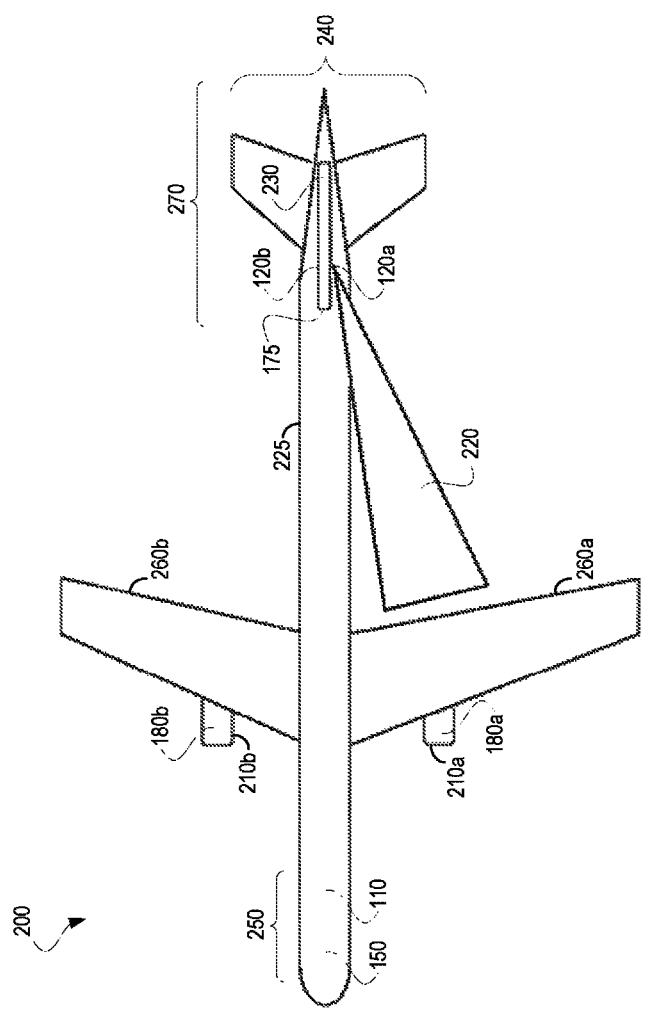
FIG. 3A is a top-view illustration of an example aircraft with optical circuitry mounted on a vertical stabilizer, according to an aspect of the present disclosure.

According to various aspects, elements of the network environment 100 are mounted and/or housed at various locations of the aircraft 200 as illustrated in the example of FIG. 3A. FIG. 3A is a view of an example aircraft 200 at rest (i.e., not under maneuvering load) from the top. The aircraft 200 comprises, among other things, a cockpit section 250 (i.e., toward the front of the aircraft) that is connected to a fuselage 225 which is connected to an empennage 270 at the aft. Also connected to the empennage are left and right wings 260a, 260b under which left and right engine nacelles 210a and 210b are mounted, respectively. The empennage 270 includes a horizontal stabilizer 240 and a vertical stabilizer 230. Other aircraft (not shown) consistent with aspects of the present disclosure include aircraft with fewer or additional engine nacelles 210 and/or an empennage 270 with stabilizers 230, 240 in a different configuration (e.g., cruciform; T-tail).

According to this example, the processing circuitry 110 of the external fire detection system 130 and the operator terminal 150 are housed in the cockpit section 250. Each nacelle 210a, 210b houses its own internal fire detection system 180a, 180b, respectively. Further, a camera 175 of a ground maneuvering camera system 170 is mounted at the front of the vertical stabilizer 230. Further still, optical circuitry 120a and 120b are mounted on the left and right sides of the vertical stabilizer, respectively. Each of the optical circuitry 120a, 120b is aft of the engine nacelles 210a, 210b, they are respectively configured to optically monitor. Other examples may mount one or more components of the network environment 100 at other locations of the aircraft, as will be further discussed below.

As shown in the example of FIG. 3A, the optical circuitry 120a on the left side of the vertical stabilizer 230 and has a field of view 220 that extends from the optical circuitry 120a towards the left wing 260a to optically monitor the exterior of the left engine nacelle 210a from the aft. Although not illustrated for the sake of clarity, the field of view 220 continues past the wing 260a and engine nacelle 210a in particular aspects. That is, the effective range of the field of view 220 may vary, e.g., based on the particular sensitivity of the optical circuitry 120a. Notwithstanding, the field of view 220 extends far enough to view the exterior of the engine nacelle 210a.

Correspondingly, the right engine nacelle 210b in this example is optically monitored by optical circuitry 120b, which has a different field of view (not shown) that extends from the optical circuitry 120b towards the right wing 260b to optically monitor the exterior of the right engine nacelle 210b from the aft.

Figure 3B:
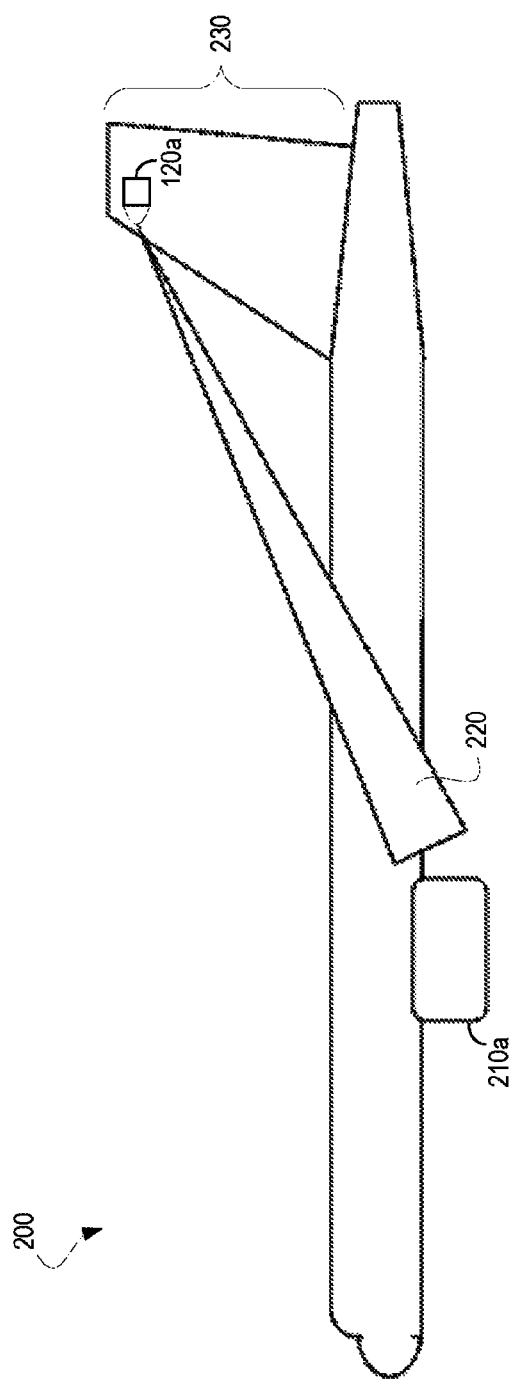
FIG. 3B is a left-side view illustration of an example aircraft with optical circuitry mounted on a vertical stabilizer, according to an aspect of the present disclosure.

FIG. 3B is an illustration of the example aircraft 200 at rest from the left side. As shown, the optical circuitry 120a is mounted on the vertical stabilizer 230 aft of the engine nacelle 210a and is configured to optically monitor the exterior of the engine nacelle for a hydrocarbon fire. In particular, the optical circuitry 120a has a field of view 220 that includes the exterior of the engine nacelle 210a.

The alignment of particular surfaces of the aircraft may be different under different conditions. In particular, maneuvering the aircraft places a load on various surfaces that causes them deflect relative to each other and/or relative to their non-loaded positions. Acrobatic maneuvers or maneuvers during turbulent conditions in particular can place significant stress on aircraft surfaces, causing them to deform and/or vibrate. According to a further aspect of the present disclosure, the engine nacelle 210a remains within the field of view 220 of the optical circuitry 120a despite such deflection. In particular, the field of view 220 comprises a perimeter 295 that is substantially defined by a maximum expected deflection of the engine nacelle 210a relative to the optical circuitry 120a under maneuvering load of the aircraft 200 such that the exterior of the engine nacelle 210a remains within the field of view 220 during the maneuvering load. This maximum expected deflection may, for example, be based on one or more load tolerances that the aircraft 200 is designed and/or observed to withstand (e.g., as verified and/or demonstrated through mechanical stress testing). According to a particular aspect, the maximum expected deflection is an estimated maximum distance by which the surfaces to which the optical circuitry 120a and engine nacelle 210a are mounted are able to shift relative to each other before the aircraft 200 is structurally compromised.

Figure 3C:
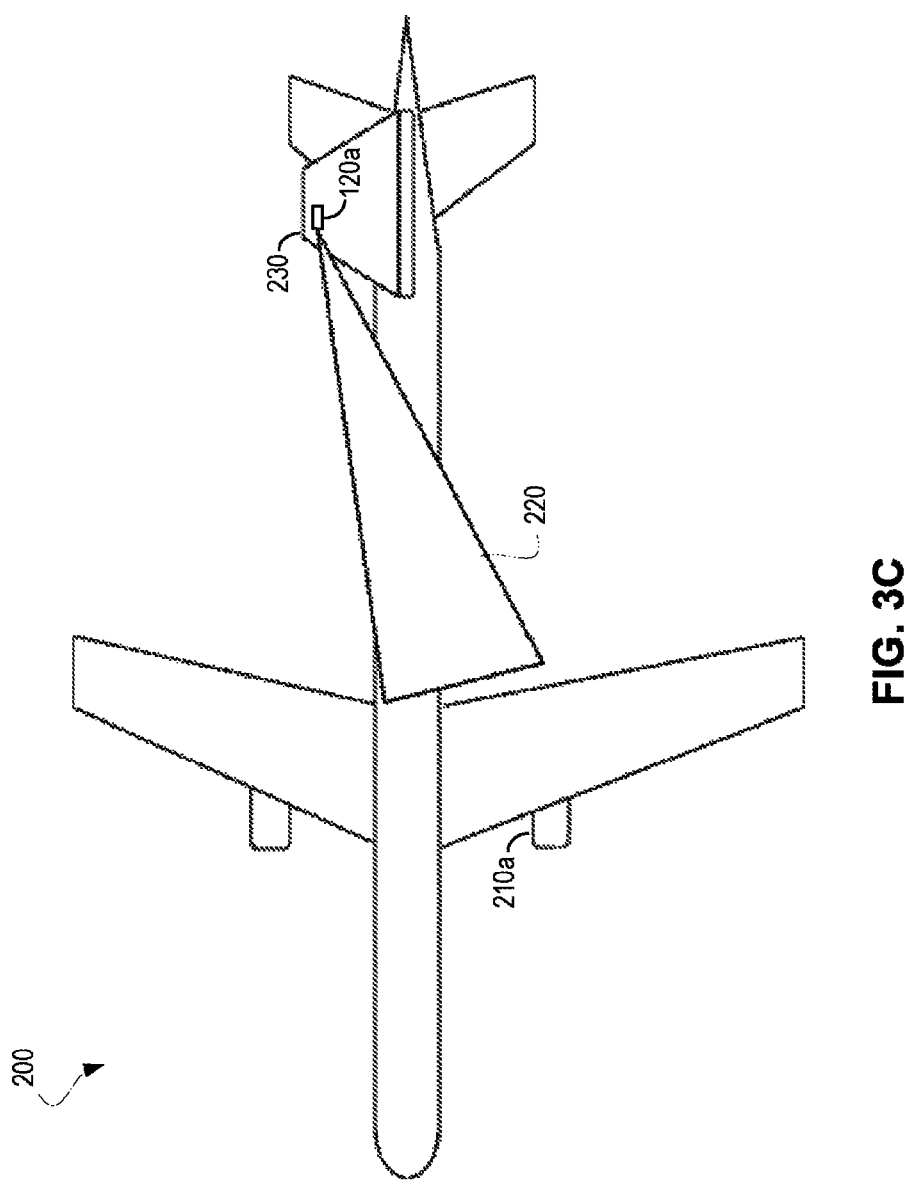
FIGS. 3C and 3D are top-view illustrations of an example aircraft under different maneuvering loads, according to aspects of the present disclosure.

FIG. 3C illustrates an example top-view of the aircraft 200 under a maximum expected deflection of the engine nacelle 210a relative to the optical circuitry 120a under a maneuvering load. In particular, in this example, the vertical stabilizer 230 (on which the optical circuitry 120a is mounted) is deflected to the right, causing the engine nacelle 210a to be deflected leftward relative to the optical circuitry 120a. This deflection causes the field of view 220 of the optical circuitry 120a to shift to the right as compared to the example of FIG. 3A (i.e, in which the maneuvering load was not present). As shown, the field of view 220 continues to include the engine nacelle 210a despite the shift.

Figure 3D:
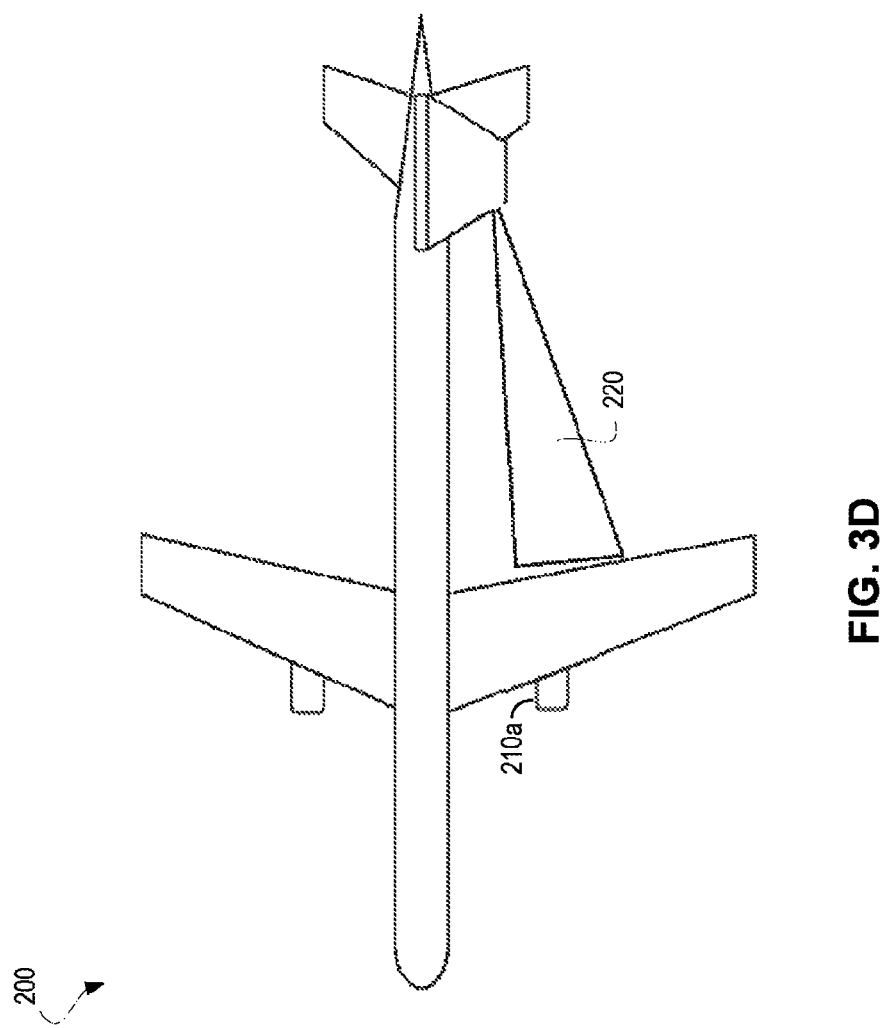

FIG. 3D illustrates an example top-view of the aircraft 200 under a maximum expected deflection of the engine nacelle 210a relative to the optical circuitry 120a under a maneuvering load in the direction opposite to that depicted in FIG. 3C. In particular, the vertical stabilizer 230 is deflected to the left, causing the engine nacelle 210a to be deflected rightward relative to the optical circuitry 120a. This deflection causes the field of view 220 of the optical circuitry 120a to shift to the left as compared to the examples of FIG. 3A (in which the maneuvering load was not present) and FIG. 3C (in which the maneuvering load was in the opposing direction). As shown, the field of view 220 continues to include the engine nacelle 210a despite the shift.

Figure 3E:
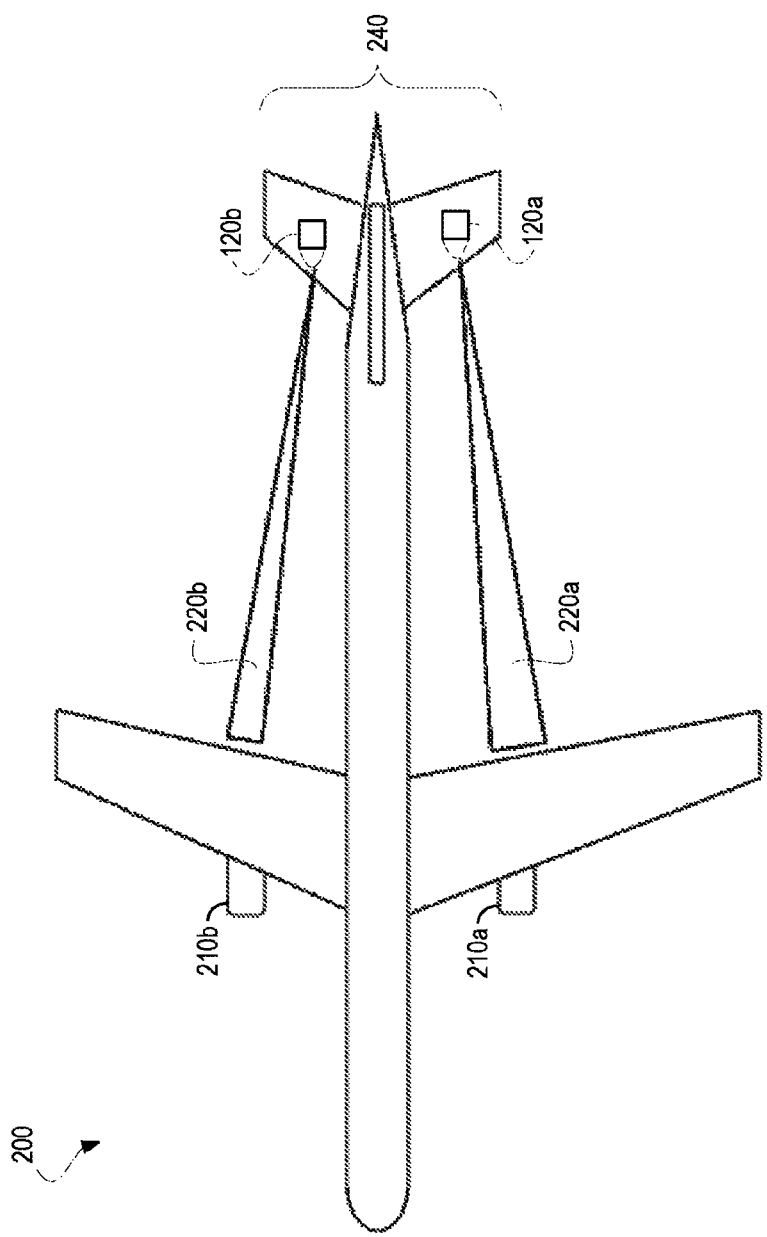
FIG. 3E is a top-view illustration of an example aircraft with optical circuitry mounted on a horizontal stabilizer, according to an aspect of the present disclosure.

Other aspects of the present disclosure include the optical circuitry 120a, 120b mounted on the horizontal stabilizer 240, as illustrated in FIG. 3E. FIG. 3E is an example top-view of the aircraft 200 at rest. As shown in the example of FIG. 3E, optical circuitry 120a and 120b have respective fields of view 220a, 220b by which the optical circuitry 120a, 120b optically monitor engine nacelles 210a and 210b, respectively.

Figure 3F:
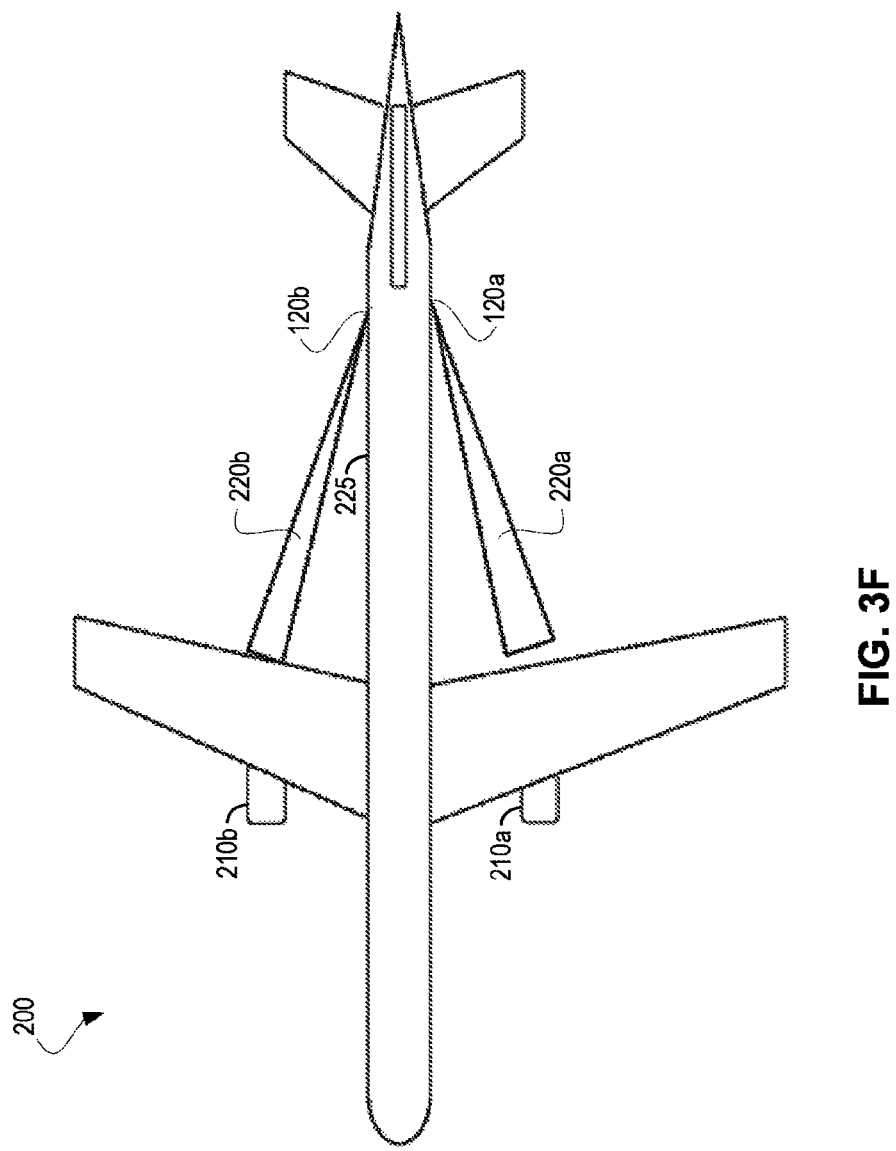
FIG. 3F is a top-view illustration of an example aircraft with fuselage-mounted optical circuitry, according to an aspect of the present disclosure.

Yet other aspects of the present disclosure include the optical circuitry 120a, 120b mounted on the fuselage 225 aft of the engine nacelles 210a, 210b, as illustrated in FIG. 3F. FIG. 3F is an example top-view of the aircraft 200 at rest. As shown in the example of FIG. 3F, optical circuitry 120a and 120b have respective fields of view 220a, 220b by which the optical circuitry 120a, 120b optically monitor engine nacelles 210a and 210b, respectively. Although the optical circuitry 120a, 120b illustrated in FIG. 3F is mounted aft of the engine nacelles 210a, 210b, in a different aspect, optical circuitry 120 is mounted on the fuselage 225 ahead of an engine nacelle 210 and has a field of view 220 that extends aftward.

Other aspects include any combination of the above. For example, optical circuitry 120a and 120b that both optically monitor engine nacelle 210a and are mounted on the left vertical and horizontal stabilizers 230, 240, respectively (and similarly with other optical circuitry 120 on the right side for engine nacelle 210b).

In view of the above, aspects of the present disclosure include a method 400, implemented in an aircraft-mounted external fire detection system 130, as illustrated in FIG. 4. The method 400 comprises optically monitoring an exterior of an engine nacelle 210 of an aircraft 200 for a hydrocarbon fire by detecting radiation outside of the visible light spectrum using optical circuitry 120 mounted on the aircraft 200 aft of the engine nacelle 210 (block 410). The method 400 further comprises using the optical circuitry 120 to determine that the fire has been continuously present for more than a threshold duration, and in response, transmitting a warning to an operator terminal 150 of the aircraft 200 (block 420).

Figure 5:
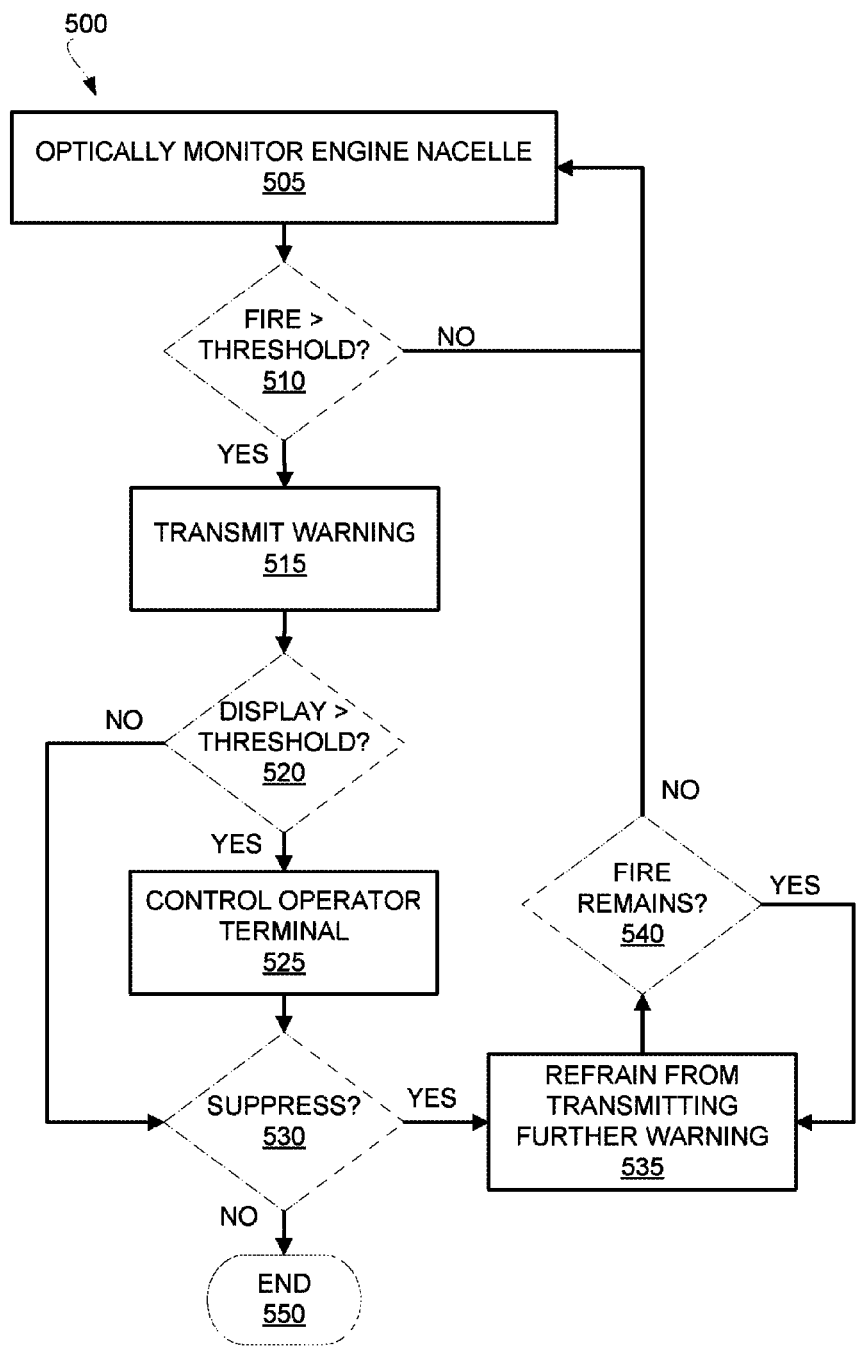
FIG. 5 is a flow diagram illustrating an further example method, according to an aspect of the present disclosure.

Further aspects of the present disclosure include a method 500, implemented in an aircraft-mounted external fire detection system 130, as illustrated in FIG. 5. According to the method 500, the external fire detection system 130 optically monitors an exterior of an engine nacelle 210 of an aircraft 200 for a hydrocarbon fire by detecting radiation outside of the visible light spectrum using optical circuitry 120a and additional optical circuitry 120b, each of which are mounted on the aircraft 200 aft of the engine nacelle 210 (block 505). The external fire detection system 130 determines whether a fire has been continuously present for more than a threshold duration using the optical circuitry 120a, and whether the fire has been continuously present for more than the threshold duration using the additional optical circuitry 120b (block 510).

If the external fire detection system 130 fails to determine that a fire has been continuously present for more than the threshold duration using each of the optical circuitry 120a and additional optical circuitry 120b (block 510, no), the external fire detection system 130 continues to optically monitor the engine nacelle 210 (block 505). If, instead, the external fire detection system 130 determines that a fire has been continuously present for more than the threshold duration using each of the optical circuitry 120a and additional optical circuitry 120b (block 510, yes), the external fire detection system 130 transmits a warning to an operator terminal 150 (e.g., so that the operator terminal 150 can activate an indicator light on an annunciator panel or otherwise present notification of the detected fire, as discussed above) (block 515).

According to the method 500, the external fire detection system 130 then determines whether a threshold number of displays 160 of an operator terminal 150 are operative (block 520). If the external fire detection system 130 determines that a threshold number of displays 160 of the operator terminal 150 are operative (block 520, yes), the external fire detection system 130 controls the operator terminal 150 to display video of the engine nacelle 210 captured by a camera 175 of a ground maneuvering camera system 170 mounted on the aircraft 200 and to which the operator terminal 150 is communicatively connected (block 525). Otherwise, the external fire detection system will not control the operator terminal to display such video (block 520, no).

Provided that the external fire detection system 130 does not receive a warning suppression signal after transmitting the warning (block 530, no), the method 500 ends (block 550). If, instead, the external fire detection system 130 does receive a warning suppression signal after transmitting the warning (block 530, yes), the external fire detection system 130 refrains from transmitting further warning to the operator terminal (block 535) for at least as long as the fire remains present (block 540, yes). Once the external fire detection system 130 determines that the fire is no longer present (block 540, no), the external fire detection system 130 continues to optically monitor the engine nacelle 210 as before (block 505).

Figure 6:
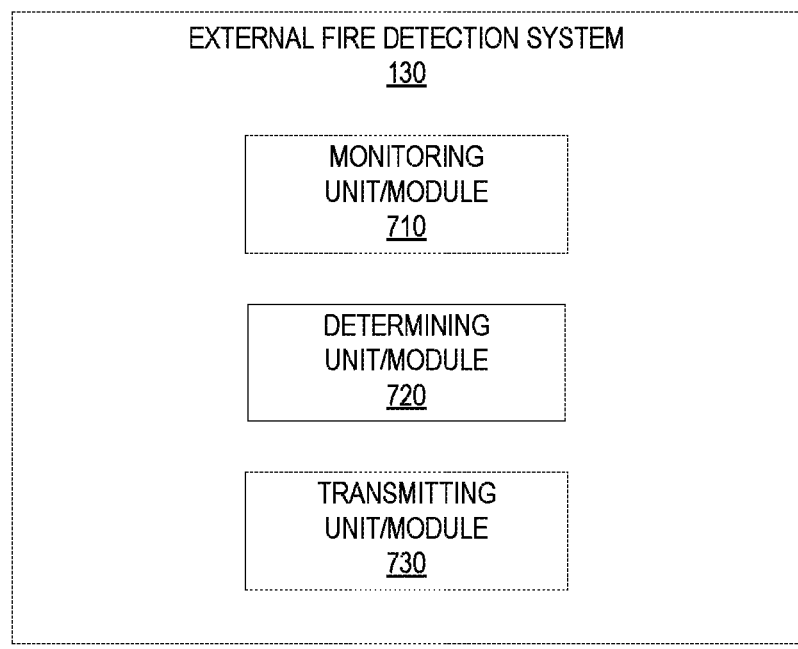
FIG. 6 is a block diagram of an example external fire detection system, according to an aspect of the present disclosure.

Aspects of the present disclosure further include the external fire detection system 130 implemented according to the hardware units and/or software modules illustrated in FIG. 6 (e.g., as components of the processing circuitry 110, components of the optical circuitry 120, and/or instructions stored in the memory 190, as illustrated in FIG. 1). The external fire detection system 130 illustrated in FIG. 6 comprises a monitoring unit and/or module 710, a determining unit and/or module 720, and a transmitting unit and/or module 730. The monitoring unit and/or module 710 is configured to optically monitor an exterior of an engine nacelle 210 for a hydrocarbon fire by detecting radiation outside of the visible light spectrum using optical circuitry 120 mounted on an aircraft 200 aft of the engine nacelle 210. The determining unit and/or module 720 is configured to use the optical circuitry 120 to determine that the fire has been continuously present for more than a threshold duration. The transmitting unit and/or module 730 is configured to transmit a warning to an operator terminal 150 of the aircraft 200 in response to the determination made by the determining unit and/or module 720.

Aspects of the present disclosure further include various methods and processes, as described herein, implemented using various hardware configurations configured in ways that vary in certain details from the broad descriptions given above. For instance, one or more of the processing functionalities discussed above may be implemented using a general-purpose microprocessor configured with program instructions rather than dedicated hardware, depending on, e.g., the design and cost tradeoffs for the various approaches, and/or system-level requirements outside the scope of the present disclosure.

Indeed, aspects of the present disclosure are, of course, carried out in other ways than those specifically set forth herein without departing from the essential characteristics therefrom. The aspects disclosed herein are to be considered in all respects as illustrative and not restrictive, and all changes coming within the meaning and equivalency range of the appended claims are intended to be embraced therein. In particular, although steps of particular processes or methods described herein are shown and described as being in a particular sequence or temporal order, the steps of any such processes or methods are not limited to being carried out in any particular sequence or order, absent an indication otherwise. Indeed, the steps in such processes or methods are generally carried out in various different sequences and orders according to particular aspects of the present disclosure while still falling within the scope of the present disclosure.

The invention claimed is:

1. An aircraft-mounted external fire detection system comprising:
    optical circuitry mounted on an aircraft aft of an engine nacelle of the aircraft, the optical circuitry being configured to optically monitor an exterior of the engine nacelle for a hydrocarbon fire by detecting radiation outside of the visible light spectrum;
    processing circuitry communicatively coupled to the optical circuitry and configured to use the optical circuitry to determine that the fire has been continuously present for more than a threshold duration, and in response, transmit a warning to an operator terminal of the aircraft.

2. The aircraft-mounted external fire detection system of claim 1, wherein to optically monitor the exterior of the engine nacelle, the optical circuitry has a field of view comprising a perimeter substantially defined by a maximum expected deflection of the engine nacelle relative to the optical circuitry under maneuvering load of the aircraft such that the exterior of the engine nacelle remains within the field of view during the maneuvering load.

3. The aircraft-mounted external fire detection system of claim 1, wherein to transmit the warning to the operator terminal, the processing circuitry is configured to control the operator terminal to display video of the engine nacelle.

4. The aircraft-mounted external fire detection system of claim 3, wherein to control the operator terminal to display video of the engine nacelle, the processing circuitry is configured to trigger the operator terminal to display video captured by a ground maneuvering camera system mounted on the aircraft and to which the operator terminal is communicatively connected.

5. The aircraft-mounted external fire detection system of claim 3, wherein the processing circuitry is configured to control the operator terminal to display video of the engine nacelle responsive to determining that at least a threshold number of displays are operative at the operator terminal.

6. The aircraft-mounted external fire detection system of claim 1, wherein to transmit the warning to the operator terminal, the processing circuitry is configured to control the operator terminal to display a notification that is distinct from a further notification produced for a different fire detection system that monitors for fire inside of the engine nacelle.

7. The aircraft-mounted external fire detection system of claim 1, wherein the processing circuitry is further configured to receive a warning suppression signal from the operator terminal, and in response, refrain from sending a further warning to the operator terminal until the processing circuitry determines that the fire is no longer present and subsequently determines that another fire has been continuously present for more than the threshold duration.

8. The aircraft-mounted external fire detection system of claim 1:
    further comprising additional optical circuitry mounted on the aircraft aft of the engine nacelle, the additional optical circuitry being configured to optically monitor the exterior of the engine nacelle for the fire by detecting radiation outside of the visible light spectrum;
    wherein the processing circuitry is further configured to refrain from transmitting the warning to the operator terminal until the processing circuitry also determines that the fire has been continuously present for more than the threshold duration using the additional optical circuitry.

9. The aircraft-mounted external fire detection system of claim 1, wherein the optical circuitry is mounted on a vertical or horizontal stabilizer of the aircraft.

10. A method, implemented in an aircraft-mounted external fire detection system, the method comprising:
optically monitoring an exterior of an engine nacelle of an aircraft for a hydrocarbon fire by detecting radiation outside of the visible light spectrum using optical circuitry mounted on the aircraft aft of the engine nacelle;
using the optical circuitry to determine that the fire has been continuously present for more than a threshold duration, and in response, transmitting a warning to an operator terminal of the aircraft.

11. The method of claim 10, wherein the optical circuitry has a field of view comprising a perimeter substantially defined by a maximum expected deflection of the engine nacelle relative to the optical circuitry under maneuvering load of the aircraft such that the exterior of the engine nacelle remains within the field of view during the maneuvering load.

12. The method of claim 10, wherein transmitting the warning to the operator terminal comprises controlling the operator terminal to display video of the engine nacelle.

13. The method of claim 12, wherein controlling the operator terminal to display video of the engine nacelle comprises triggering the operator terminal to display video captured from a ground maneuvering camera system mounted on the aircraft and to which the operator terminal is communicatively connected.

14. The method of claim 12, controlling the operator terminal to display video of the engine nacelle is responsive to determining that at least a threshold number of displays are operative at the operator terminal.

15. The method of claim 10, wherein transmitting the warning to the operator terminal comprises controlling the operator terminal to display a notification that is distinct from a further notification produced for a different fire detection system that monitors for fire inside of the engine nacelle.

16. The method of claim 10, further comprising receiving a warning suppression signal from the operator terminal, and in response, refraining from sending a further warning to the operator terminal until determining that the fire is no longer present and subsequently determining that another fire has been continuously present for more than the threshold duration.

17. The method of claim 10, further comprising:
optically monitoring the exterior of the engine nacelle for the fire by detecting radiation outside of the visible light spectrum using additional optical circuitry mounted on the aircraft aft of the engine nacelle;
refraining from transmitting the warning to the operator terminal until it is also determined that the fire has been continuously present for more than the threshold duration using the additional optical circuitry.

18. The method of claim 10, wherein the optical circuitry is mounted on a vertical or horizontal stabilizer of the aircraft.

19. A non-transitory computer readable medium storing a computer program product for controlling a programmable aircraft-mounted external fire detection system, the computer program product comprising software instructions that, when executed on processing circuitry of the programmable aircraft-mounted external fire detection system, cause the processing circuitry to:
use optical circuitry, mounted on an aircraft aft of an engine nacelle of the aircraft and configured to optically monitor an exterior of the engine nacelle for a hydrocarbon fire by detecting radiation outside of the visible light spectrum, to determine that the fire has been continuously present for more than a threshold duration; and
transmit a warning to an operator terminal of the aircraft in response to the determination.

20. The non-transitory computer readable medium of claim 19, wherein the software instructions cause the processing circuitry to transmit the warning to the operator terminal by controlling the operator terminal to display a notification that is distinct from a further notification produced for a different fire detection system that monitors for fire inside of the engine nacelle, the notification comprising video captured by a ground maneuvering camera system mounted on the aircraft to which the operator terminal is communicatively connected.

* * * * *